United States Patent [19]
Ishikawa et al.

[11] Patent Number: 4,564,721
[45] Date of Patent: Jan. 14, 1986

[54] GAS-INSULATED ELECTRICAL APPARATUS WITH ELECTRET FOR CAPTIVATING CONDUCTIVE PARTICLES AND METHOD OF REMOVING SUCH PARTICLES DURING ASSEMBLY THEREOF

[75] Inventors: Toshio Ishikawa; Fumihiro Endo; Tokio Yamagiwa; Yuzuru Kamata, all of Hitachi, Japan

[73] Assignee: Hitachi, Ltd., Tokyo, Japan

[21] Appl. No.: 724,200

[22] Filed: Apr. 17, 1985

[30] Foreign Application Priority Data

Apr. 18, 1984 [JP] Japan .................................. 59-76500
Sep. 5, 1984 [JP] Japan ................................. 59-184494

[51] Int. Cl.⁴ ........................ H02G 5/06; H02B 13/06; H02G 1/00
[52] U.S. Cl. ........................................ 174/10; 134/42; 174/14 R

[58] Field of Search ..................... 174/10, 14 R, 16 B, 174/17 GF; 55/DIG. 39; 29/592 E, 593, DIG. 7; 134/42

[56] References Cited

U.S. PATENT DOCUMENTS 4,330,682  5/1982  Dale et al. ........................ 134/42 X
4,343,964  8/1982  Wootton ............................... 174/10

FOREIGN PATENT DOCUMENTS 2422961  10/1975  Fed. Rep. of Germany .... 174/14 R
52-71619   6/1977  Japan ................................. 174/14 R
55-136811 10/1980  Japan ................................. 174/14 R Primary Examiner—Laramie E. Askin
Attorney, Agent, or Firm—Antonelli, Terry & Wands

[57] ABSTRACT

An electret capable of holding electric charges semi-permanently is used to attract conductive particles generated or intruded in a gas-insulated electric apparatus during assembly work including an operation test of movable parts thereof, thus improving the reliability of insulation characteristic of the apparatus.

15 Claims, 14 Drawing Figures

GAS-INSULATED ELECTRICAL APPARATUS WITH ELECTRET FOR CAPTIVATING CONDUCTIVE PARTICLES AND METHOD OF REMOVING SUCH PARTICLES DURING ASSEMBLY THEREOF

BACKGROUND OF THE INVENTION

The present invention relates generally to a gas-insulated electric apparatus and a method of assembly thereof, or more in particular to a gas-insulated electric apparatus and a method of assembly thereof which has a construction suitable for preventing the decrease in the dielectric strength thereof ever in the case where conductive particles have intruded into or have been produced in the apparatus.

A gas-insulated electric apparatus is often constructed of a high-voltage structure member making up a conductor arranged in a metallic tubular member hermetically sealed with a electro-negative gas such as $SF_6$ gas. Should a conductive particle intrude into this apparatus and sink and stay on the bottom of the tubular member, the conductive particle rises up from the interior surface of the tubular member independence on the electric field in the tubular member and floats in the gas space. This floating conductive particle extremely reduces the dielectric strength of the gas space. In order to secure the reliable insulation characteristic of the apparatus, it is desirable to construct an apparatus capable of protecting itself from the effect of the conductive particle.

Various apparatuses intended to obviate this problem have so far been conceived, in which an electrode of low electric field intensity is arranged on that part of the bottom of the tubular member where conductive particles fall and stay so that the particles may be caught in the electrode of low electric field intensity. In the case where the apparatus is arranged slantwise or is subjected to mechanical vibrations, however, the particle is liable to drift from the electrode of low electric field intensity and may be exposed to the parts of high electric field intensity again.

In order to obviate this problem, a conventional apparatus has been proposed, as disclosed in Japanese Patent Application Laid-Open No. 136811/80, in which an insulating layer of high dielectric constant is formed on the interior surface of the tubular member whereby the voltage applied to the apparatus gives rise to an electrostatic attraction force sufficiently strong to resist the electrostatic buoyancy acting on the conductive particle, thereby dampening the floating motion of the conductive particle. Such an apparatus requires an insulating layer formed of a material of high dielectric constant whose specific dielectric constant is higher than a predetermined value. A ferroelectric material mainly comprising a ferroelectric substance such as $BaTiO_3$ is often used as the material making up the insulating layer of high dielectric constant. Such a ferroelectric material, however, is considerably expensive, and the cost thereof may account for a considerable portion of the total cost of an apparatus which requires the insulating layer over a wide area.

SUMMARY OF THE INVENTION

Accordingly, it is an object of the present invention to provide an insulating layer which is low in cost and is capable of fully attracting the conductive particles intruded or produced in the apparatus.

Another object of the present invention is to provide a method of assemblying a gas-insulated electric apparatus, including a method of effectively removing the conductive particles which may reside in the apparatus before starting operation thereof.

According to the present invention, there is provided a gas-insulated electric apparatus and a method of assembly thereof, in which an electret capable of holding electron charges permanently inside thereof is used and arranged in the apparatus as an insulating layer for attracting the conductive particles.

BRIEF DESCRIPTION OF THE DRAWINGS

The invention will be described in detail with reference to the accompanying drawings, in which.

DESCRIPTION OF THE PREFERRED EMBODIMENTS

Figure 1:
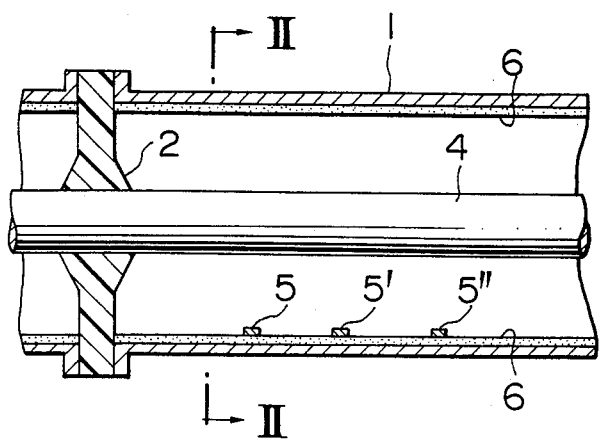
FIG. 1 is a longitudinal sectional view taken on the line I—I of FIG. 2 of a gas-insulated electric apparatus according first embodiment of the present invention.
Figure 2:
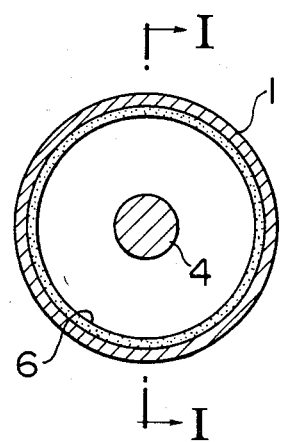
FIG. 2 is a cross sectional view taken on line II—II of the embodiment shown in FIG. 1.
Figure 3:
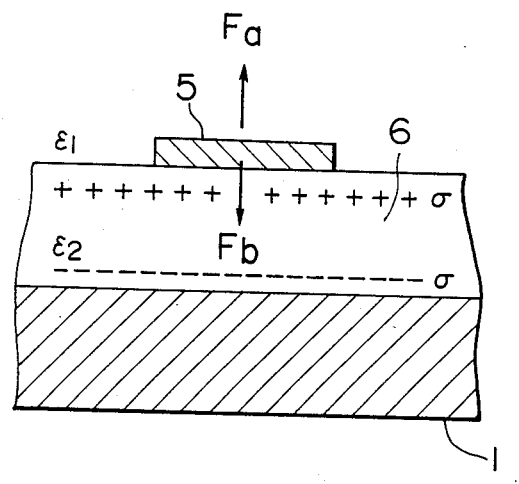
FIGS. 3, 4 and 5 are diagrams showing the principle of the present invention.

With reference to FIGS. 1, 2 and 3, a high-voltage conductor 4 is supported on an insulating support 2 in a metallic tubular member or a grounded tank 1 hermetically sealed with an insulating gas such as $SF_6$. The inner peripheral surface of the metallic tubular member 1 is closely covered with an adhesive sheet of insulating layer 6 formed of a high polymeric substance. The high polymeric substance forming the insulating layer 6 is an electret which is polarized by being supplied with a DC electric field or injected with charged particles such as ions, thus capable of semi-permanently holding the electron charges therein. A method of fabricating such an, electret is described in "Corona Poling of Polyvinylidenefluoride", by R. Gerhard-Multhaupt (1983 Annual Rep. Conf. on Elect. Insu. and Dielect. Phenomena) and "Sound Wave Sensor" by S. Tamura and M. Wada (Industrial Materials, Vol. 30, No. 6, pp 60 to 66). Application of the electret to a filter for a dust mask and vacuum cleaner, on the other hand, is reported in "Electret Filter" by M. Kajimaki (The Institute of Electrostatics Japan Journal Vol. 7, No. 2, pp 99 to 106, 1983). The electret, however, has never been used as an insulating layer in a gas-insulated electric apparatus.

Conductive particles 5, 5', 5'' which fall and stay on an insulating layer 6 are attracted to the surface of the insulating layer 6 under a strong electrostatic force such as coulomb force caused by the surface charges formed on the insulating layer 6. The insulating layer 6 is required to satisfy the relation $$Fa << Fb + Fm \quad (1)$$

between the electrostatic attraction force Fb, the gravity Fm of the particles, and the electrostatic buoyancy Fa acting on the particles (Fa ∝ Q.Es, where Q: Supplied amount of charges, and Es: The electric field on the interior surface of the tubular member 1).

In FIG. 3, the electrostatic attraction force Fb shown by the equation below is exerted on the particles 5 on the insulating layer 6 formed on the interior surface of the tubular member 1.

$$Fb \propto \frac{\sigma Q}{\epsilon_0 \epsilon_2} \quad (2)$$

where $\epsilon_0$ is the dielectric constant of vacuum, $\epsilon_2$ is the dielectric constant of the insulating layer, $\sigma$ is the surface charge density of the insulating layer, and Q is the charges of the particles.

Specifically, Fb depends on the surface charge density $\sigma$ formed by the charges held in the insulating layer, and therefore, it is possible to obtain Fb satisfying equation (1) by increasing the amount of $\sigma$. The amount of the charges held internally in the insulating layer can be easily increased by the amount of injection of ions or the like at the time of fabrication of the electret, or what is called the magnitude of the intensity of the DC electric field. Further, the efficiency of forming the internally-held charges also depends on the orientation of dipoles attached to molecules in the material making up the insulating layer. This function is effectively displayed by such a high polymeric material as polyvinylidene fluoride or polypropylene suitable for the electret as the material forming the insulating layer 6.

If the force of attracting the conductive particles is to be improved, it is desirable to employ an organic or inorganic material high in electrical insulation resistance and low in water absorption rate.

The above-mentioned high polymeric material, if provided in a sheet, can be conveniently handled on the one hand and facilitates the installation in the apparatus on the other hand, thus making the apparatus more economical.

Figure 4:
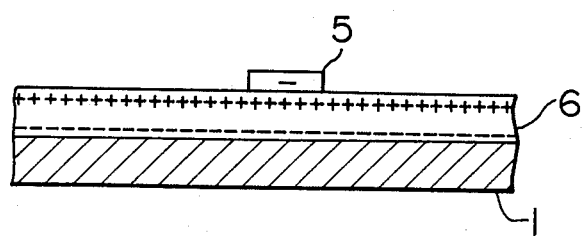
Figure 5:
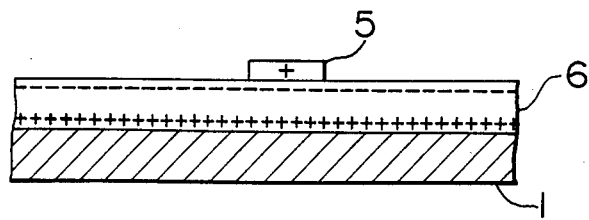
Figure 6:
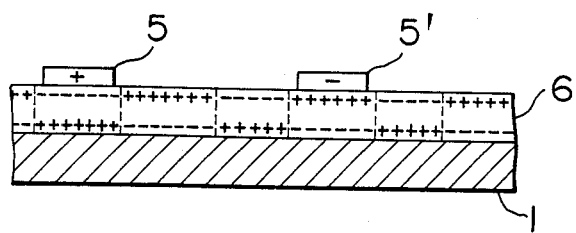
FIGS. 6 and 7 are diagrams showing a second embodiment of the present invention.
Figure 7:
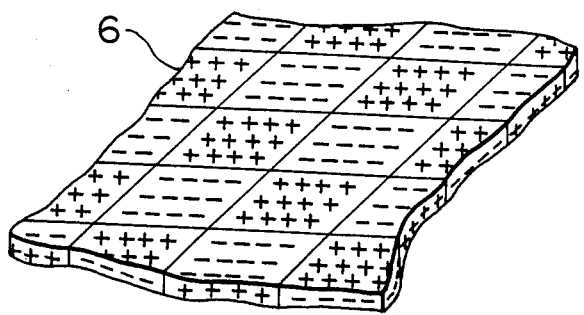

The orientation of polarization of the electret material forming the insulating layer is easily reversible by selection of the DC voltage in the polarization process, and surface charges of the insulating layer are used in polarities as shown in FIGS. 4 and 5 in accordance with the charging characteristics of the particles. FIGS. 4 or 5 shows the case in which a positive or negative single-pole electrode is formed over the entire area of the surface of the insulating layer. In the case where the polarities of the particles change by partial discharge or like from the ends of the particles, the insulating layer may be divided into a plurality of regions 6' where positive and negative charges are mixed with each other in such a manner that the polarities of the surface charges of adjacent regions are opposite to each other, so that the attraction force may be effected by particles of any polarity, as shown in the second embodiment of FIGS. 6 and 7.

The selection of the polarity of the surface charges in the manner mentioned above permits all the particles 5, 5' including uncharged and positively or negatively charged ones to be caught on the insulating layer 6.

Figure 8:
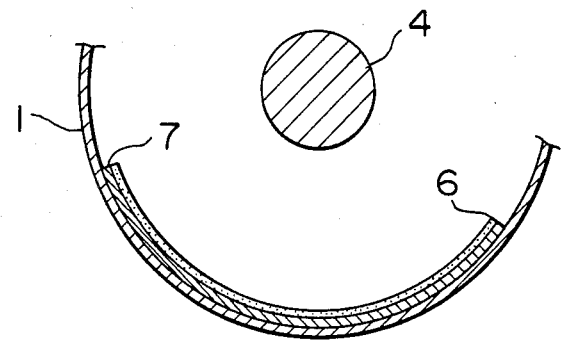
FIG. 8 is a partial sectional view of a third embodiment of the.present invention.

FIG. 8 shows a third embodiment for forming the insulating layer. A metallic insulation layer base plate 7 on which an electret material 6 is laid in advance is arranged as an insulating layer along the internal periphery of a tubular member 1. According to this embodiment, the insulating layer can be processed into an electret by an exclusive device prepared outside of the apparatus, and therefore the processes are greatly simplified the processing accuracy is improved, and easier installation on the apparatus becomes possible.

Furthermore, a reticular material or a material having a plurality of punched holes may be used as the insulating layer base plate 7 to reduce the contact area between the electret material 6 and the insulating layer base plate 7 while at the same time conducting the tube-sealed gas between the internal surfaces of the tubular member 1 and the insulating layer base plate 7. According to this third embodiment, voids which otherwise would be liable to develop between the electret material 6 and the insulating layer base plate 7 are not formed, thereby making it possible to eliminate the disturbance of the polarization orientation of the surface charges of the insulating layer which would otherwise be caused by the partial discharge in the voids.

The effect of the present invention can be fully achieved if the insulating layer according to the second or third embodiment is formed only at a part where particles are liable to fall and stay.

Figure 9:
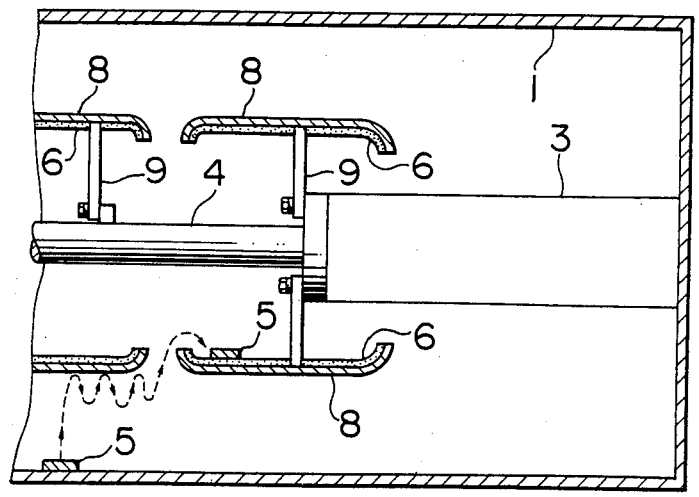
FIG. 9 is a partial sectional view of a fourth embodiment of the present invention.

Referring to FIG. 9, an insulating layer 6 making up an electret material is formed on the internal surface of the electric field-relaxing shield 8 in the low-intensity electric field. When the particles existent on the internal surface of the tubular member 1 approach and intrude into the internal surface of the shield 8 by vibrations or like, the particles are attracted to the shield 8, so that the particle cannot fly out of the shield 8. Therefore, the particles are not attached to the insulating spacer 3 or the like supported at the end of the tubular member, thus preventing the insulation of the apparatus from being decreased. The shield 8 is supported on the insulating spacer 3 by a shield support 9.

Figure 10:
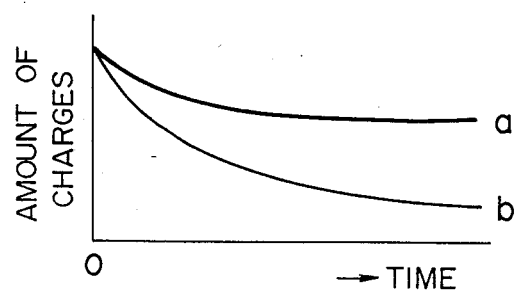
FIG. 10 is a graph showing the effect of the fourth embodiment of the present invention.

The attenuation of the charges held by the electret, which is a problem generally posed, is avoided by this construction in which the insulating layer 6, that is, the electret material, is arranged on the internal surface of the shield 8 in a low-intensity electric field in the manner shown in a fourth embodiment of the present invention. Specifically the attenuation (a) of the charges held by the insulating layer arranged on the low-voltage side is smaller than the attenuation (b) of the charges held by the insulating layer arranged on the high-voltage side as shown in FIG. 10. The insulating layer arranged on the low-voltage side thus remains effective for longer than several decades.

Figure 11:
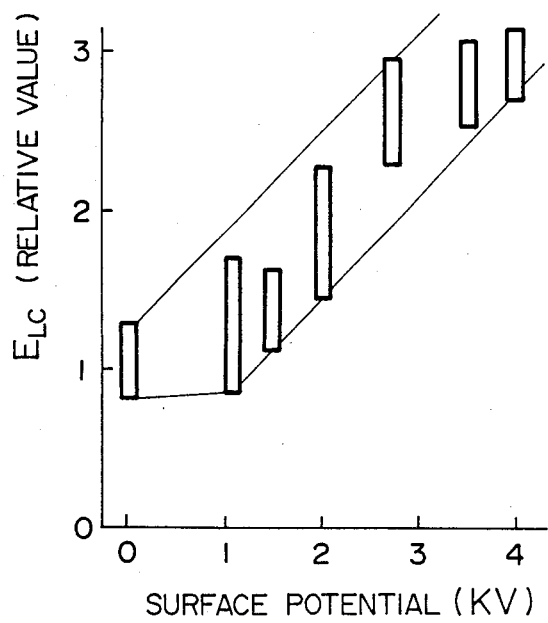
FIG. 11 is a graph showing the relationship between the surface potential of an electret and the relative attraction force or adsorptivity of the electret attracting conductive particles.

The force which the electret has for attracting the particles is affected by the amount of the surface charges, that is, the surface potential of the electret. Referring to FIG. 11, the abscissa represents the surface potential of the electret, and the ordinate the relative value $E_{LO}$ of the intensity of the electric field attracting the particles with the surface potential of zero as a reference. In the case of an electret film of furol ethylene propylene copolymer, for example, a value of $E_{LO}$ effective for attracting the particles was obtained when the surface potential of the electret is 1 KV or higher.

An electret of the surface potential of 1 KV or higher, therefore, is used according to the present invention. Although the value $E_{LO}$ increases in proportion to the surface potential, the surface potential takes a maximum value where the electret layer is not subjected to dielectric breakdown. In the case of electret film of furol ethylene propylene copolymer 100 μm thick, the maximum value of the surface potential is 3.5 KV. The electret of polypropylene film 100 μm thick, on the other hand, has a maximum surface potential of about 20 KV.

Figure 12:
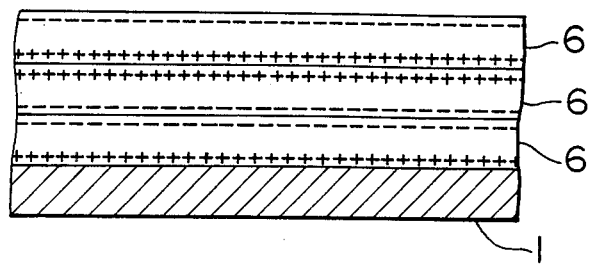
FIG. 12 is a diagram showing a fifth embodiment of the present invention.

Referring to FIG. 12, three electret layers are deposited on the internal surface of the metallic tubular member 1. The surfaces of these three electret layers facing each other have charges of the same polarity. In the process of assemblying the gas-insulated electric apparatus, the hand or other parts of the worker may touch an electret layer and the resulting discharge may reduce the surface potential of the particular electret layer during the work after arrangement of the electret layers on the internal surrace of the tubular member 1. It is possible to secure the required surface potential by removing the uppermost electret layer which is likely to have decreased in surface potential, after assembly processes of the apparatus. The electret layer thus removed may of course be used again. The electret shown in three layers in FIG. 12 may alternatively be in two or four or more layers.

Figure 13:
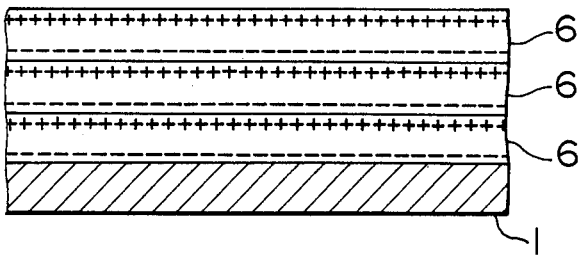
FIG. 13 is a diagram showing a sixth embodiment of the present invention.

Reference is had to FIG. 13. The surfaces of the three electret layers formed on the internal surface of a metallic tubular member 1 facing each other carry charges of opposite polarities. The surface potential is thus capable of being adjusted by the number of electret layers formed. If each layer has a surface potential of 1 KV, for instance, three layers produce a total surface potential of 3 KV and four layers a total of 4 KV.

Unlike in the aforementioned embodiments in which the insulating layer remains in the gas-insulated apparatus during the operation thereof, the insulating layer may be taken out of the apparatus before the operation of the apparatus.

Figure 14:
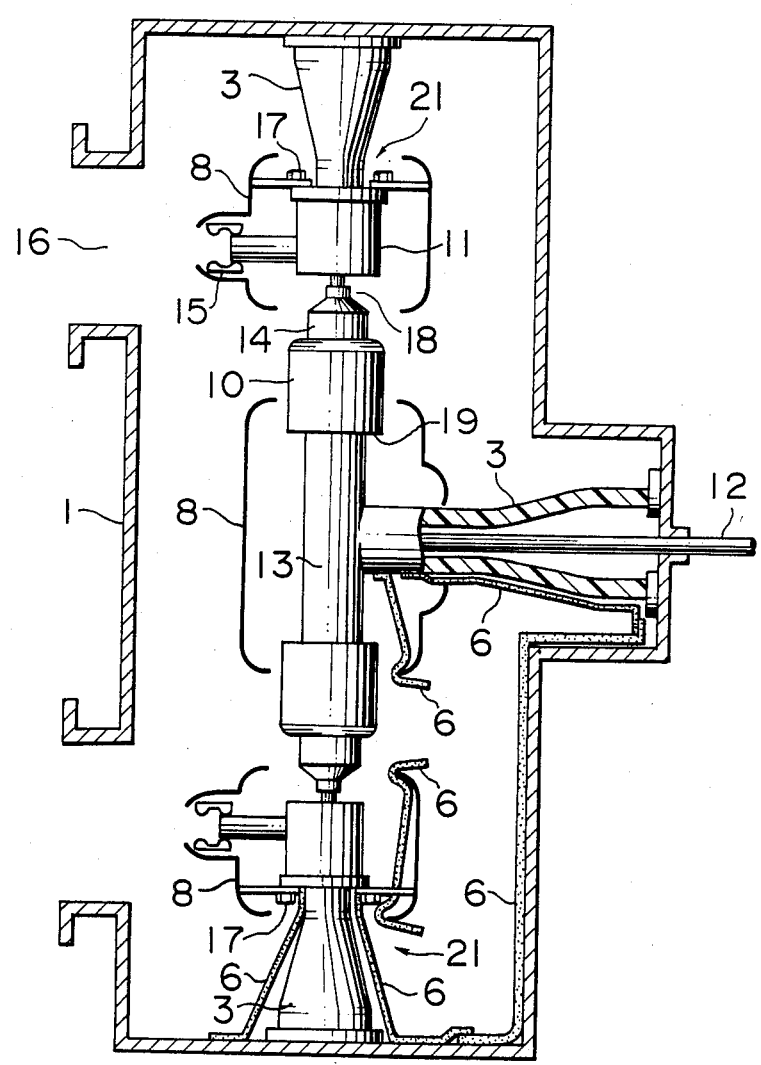
FIG. 14 is a diagram showing an embodiment of the method of assemblying a gas-insulated electric apparatus according to the present invention.

A method of assemblying a gas-insulated electric apparatus according to the present invention will be explained below with reference to a gas-insulated circuit breaker shown in FIG. 14 as an example of the apparatus.

A grounded tank 1 contains a couple breaker units including a movable electrode 10 and a fixed electrode 11 which are supported insulated from the grounded tank 1 by insulating supports 3. Although a couple of such breaker units are provided in the example shown, any number of breaker units may be provided.

In the breaking operation, an insulation control rod 12 is driven by an external command, the movable electrode 10 is energized through a link means built in a mechanism 13 thereby to open the electrodes 10 and 11, so that a gas is blown against the arc generated by separation of the electrodes 10 and 11, from a nozzle 14 around the movable electrode 10. A shield electrode 8 for relaxing the electric field intensity is mounted around the movable electrode 10 and the fixed electrode 11. The fixed electrode 11 is connected with a contactor 15, which in turn is connected with a conductor of another gas-insulated apparatus by which the opening 16 is closed. The grounded tank 1 of the breaker constructed in the manner as described above is filled with an $SF_6$ gas or like before operation.

The circuit breaker of this construction generates not a small quantity of conductive particles by mechanical vibration or electrical stress such as an operation test of movable parts or an insulation test in the final or other assembly process, and by vibration due to the transport of the apparatus to the site of operation. Such conductive particles, though small in amount, are generated at a fastening part 21 which is fastened by bolts 17 in mounting the shield 8 shown. Conductive particles are also generated from sliding parts 18,19 during the operation test of the movable parts. The conductive particles thus generated fall not always on the bottom of the grounded tank but may intrude into the shield 8 or into the corners of the grounded tank. In order to remove these conductive particles, sheets of electret material 6 are laid in the circuit breaker under assembly as shown in the lower right part of the drawing. The electret material is also laid on the other parts of the breaker, not shown in the drawing. The electret materials 6 cover the outer surface of the insulating support 3 in order to keep off the conductive particles from the surface of the insulating support 3. The electret material 6 is also arranged on the lower part of the shield 8 to protect the shield 8 from the conductive particles, which if intruded into the shield 8, would be difficult to remove. The electret material 6 is further laid on the lower half surface of the grounded tank 1 to capture the conductive particles that have fallen.

By doing so, the conductive particles that are generated at the time of assembly or an operation test of movable parts are attracted by the electrostatic attraction force of the electret materials. The electret materials are taken out of the apparatus at least before the operation of the breaker, such as at the time of final sealing from the atmosphere, for example, thereby removing the fine conductive particles which have so far been difficult to remove. These electret materials have a very long discharge time constant of the charges and therefore are capable of holding the static electricity semi-permanently. In other words, unlike an ordinarily-charged material, these materials display a full dust-collecting ability even during the rainy season when humidity is comparatively high. The electret materials, once taken out, can be cleaned separately thereby to maintain the static electricity.

In this way, the conductive particles which are generated during assembly and remain through the operation are minimized, thus preventing the conventionally-threatened deterioration of the insulation characteristic. The effect of this apparatus is especially great with gas-insulated apparatuses having movable parts, such as a circuit breaker, a gas-insulated circuit breaker or a ground switch since fine conductive particles generated during the repetitive operation test of the movable parts conducted in the final stage of assembly are removed without fail.

Although the above embodiments are explained with reference to a switch as an example of the gas-insulated apparatus, the present invention is also applicable to a gas-insulated bus with a conductor supported by an insulating support in a grounded tank. Further, if the electret materials are cut into pieces of such a size as to be capable of being recovered by vacuum cleaner and laid in the grounded tank, the materials can be recovered by vacuum cleaner at least before operation. Furthermore, the electrostatic electret materials may be placed in the grounded tank before the operation test of the movable parts. Alternatively, the electret materials may be taken out immediately after the movable-part operation test or after transportation of the apparatus to the site of operation.

We claim:

1. A gas-insulated electric apparatus comprising:
a metallic tubular member hermetically sealed with an insulating gas;
a high-voltage conductor supported by insulating supports in said metallic tubular member; and
at least one insulating layer disposed in said metallic tubular member, said insulating layer being an electret made of a high polymeric material capable of holding charges therein semi-permanently.

2. An apparatus according to claim 1, wherein said insulating layer is in the form of a sheet arranged in close contact on the interior of said metallic tubular member.

3. An apparatus according to claim 2, wherein said insulating layer in sheet form is divided into a plurality of regions, adjacent ones of which have surface charges of opposite polarities.

4. An apparatus according to claim 2, wherein that surface of said insulating layer in sheet form which faces the internal surface of said tubular member is formed with an insulating layer base plate made of recticular material.

5. An apparatus according to claim 1, wherein said insulating layer is divided into a plurality of regions, adjacent ones of which have surface charges of opposite polarities.

6. A gas-insulated electric apparatus according to claim 1, further comprising a shield for relaxing the intensity of the electric field, said shield disposed between the interior surface of said metallic tubular member and the high-voltage conductor, said insulating layer being arranged on the side of said shield facing said high-voltage conductor.

7. An apparatus according to claim 1, wherein the surface potential of said insulating layer is at least 1 KV.

8. An apparatus according to claim 1, comprising at least two insulating layers, wherein the surface charges appearing on the opposite surfaces of adjacent ones of said layers have the same polarity.

9. An apparatus according to claim 1, comprising at least two insulating layers, wherein the surface charges appearing on the opposite surfaces of adjacent ones of said layers have different polarities.

10. A method of removing conductive particles which intrude into or generate in a gas-insulated electric apparatus during assembly work thereof, the apparatus comprising a metallic tubular member and a high-voltage conductor supported by insulating support members in said metallic tubular member, comprising the steps of:
inserting at least one insulating layer made of an electret of high polymeric material capable of holding charges semi-permanently, into said gas-insulated electric apparatus, so that the conductive particles floating in said gas-insulated electric apparatus may be attracted to the surface of said insulating layer;
taking out said conductive particles from said gas-insulated electric apparatus together with said insulating layer; and
hermetically sealing an insulating gas in said metallic tubular member.

11. A method according to claim 10, further comprising the steps of, supplying mechanical vibration to said gas-insulated electric apparatus, and supplying electrical stress to said gas-insulated electric apparatus.

12. A method according to claim 11, wherein said step of supplying mechanical vibration to said gas-insulated electric apparatus is an operation test of movable parts of said gas-insulated electric apparatus.

13. A method according to claim 11, wherein said step of supplying electrical stress to said gas-insulated electric apparatus is an insulation test for said electric apparatus.

14. A method according to claim 10, further comprising the step of, transporting said gas-insulated electric apparatus to a site of said electric apparatus.

15. A method according to claim 14, wherein said transporting step is processed prior to said step of taking out said conductive particles from said gas-insulated electric apparatus.

* * * * *